United States Patent
Bai et al.

(10) Patent No.: US 11,005,706 B2
(45) Date of Patent: May 11, 2021

(54) METHOD FOR CONFIGURING FORWARDING TABLE FOR USER EQUIPMENT, APPARATUS, AND SYSTEM

(71) Applicant: Huawei Technologies Co., Ltd., Shenzhen (CN)

(72) Inventors: Yuanling Bai, Shenzhen (CN); Wenle Yang, Shenzhen (CN); Ruobin Zheng, Shenzhen (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 21 days.

(21) Appl. No.: 15/852,905

(22) Filed: Dec. 22, 2017

(65) Prior Publication Data

US 2018/0123879 A1    May 3, 2018

Related U.S. Application Data

(63) Continuation of application No. PCT/CN2016/085991, filed on Jun. 16, 2016.

(30) Foreign Application Priority Data

Jun. 23, 2015  (CN) .......................... 201510349681.7

(51) Int. Cl.
*H04L 12/24* (2006.01)
*H04L 12/721* (2013.01)
(Continued)

(52) U.S. Cl.
CPC ...... *H04L 41/0803* (2013.01); *H04L 41/5041* (2013.01); *H04L 41/5077* (2013.01);
(Continued)

(58) Field of Classification Search
CPC . H04L 12/46; H04L 41/0803; H04L 41/5041; H04L 41/5077; H04L 45/54;
(Continued)

(56) References Cited

U.S. PATENT DOCUMENTS

| | | | |
|---|---|---|---|
| 7,324,513 | B2 | 1/2008 | Shankar et al. |
| 2005/0190752 | A1 | 9/2005 | Chiou et al. |

(Continued)

FOREIGN PATENT DOCUMENTS

| | | | |
|---|---|---|---|
| CN | 1466340 A | | 1/2004 |
| CN | 1561052 A | | 1/2005 |

(Continued)

OTHER PUBLICATIONS

Pawel Parol, Towards networks of the future: SDN paradigm introduction to PON networking for business applications, 2013, Proceedings of the 2013 Federated Conference on Computer Science and Information systems, pp. 829-835 (Year: 2013).*

(Continued)

*Primary Examiner* — Joe Chacko
(74) *Attorney, Agent, or Firm* — Conley Rose, P.C.

(57) ABSTRACT

A method for configuring a forwarding table for user equipment, an apparatus, and a system, where an operator server receives a service access request of user equipment, establishes a correspondence for the user equipment, and sends the correspondence to an access node (AN) controller. The correspondence includes a media access control (MAC) address of the user equipment and an identifier of an operator to which the user equipment belongs. The AN controller generates a first forwarding table according to the correspondence, and sends the first forwarding table to an AN. The AN forwards, using the first forwarding table, service data of the user equipment to the operator to which the user equipment belongs.

18 Claims, 5 Drawing Sheets

(51) Int. Cl.
*H04L 12/741* (2013.01)
*H04L 12/935* (2013.01)
*H04L 12/46* (2006.01)
*H04L 29/12* (2006.01)
*H04L 12/911* (2013.01)

(52) U.S. Cl.
CPC .............. *H04L 45/54* (2013.01); *H04L 45/66* (2013.01); *H04L 49/3009* (2013.01); *H04L 12/46* (2013.01); *H04L 47/70* (2013.01); *H04L 61/2007* (2013.01); *H04L 61/6022* (2013.01)

(58) Field of Classification Search
CPC ..... H04L 45/66; H04L 47/70; H04L 49/3009; H04L 61/2007; H04L 61/6022
See application file for complete search history.

(56) References Cited

U.S. PATENT DOCUMENTS

| | | | |
|---|---|---|---|
| 2014/0314090 A1 | 10/2014 | Zheng et al. | |
| 2015/0201447 A1* | 7/2015 | Li | H04W 36/0066 455/450 |
| 2015/0334057 A1* | 11/2015 | Gao | H04L 49/351 370/392 |

FOREIGN PATENT DOCUMENTS

| CN | 101127696 A | 2/2008 |
|---|---|---|
| CN | 101409685 A | 4/2009 |
| CN | 102055641 A | 5/2011 |
| CN | 102714614 A | 10/2012 |
| CN | 103684861 A | 3/2014 |
| EP | 2763355 A2 | 8/2014 |
| EP | 3051778 A1 | 8/2016 |
| EP | 3073697 A1 | 9/2016 |
| WO | 2014090150 A1 | 6/2014 |
| WO | 2014183701 A1 | 11/2014 |
| WO | 2015085559 A1 | 6/2015 |

OTHER PUBLICATIONS

Machine Translation and Abstract of Chinese Publication No. CN1466340, dated Jan. 7, 2004, 25 pages.
Machine Translation and Abstract of Chinese Publication No. CN1561052, dated Jan. 5, 2005, 19 pages.
Foreign Communication From a Counterpart Application, Chinese Application No. 201510349681.7, Office Action dated Nov. 29, 2018, 8 pages.
Machine Translation and Abstract of Chinese Publication No. CN101409685, dated Apr. 15, 2009, 22 pages.
Machine Translation and Abstract of Chinese Publication No. CN102055641, dated May 11, 2011, 13 pages.
Machine Translation and Abstract of Chinese Publication No. CN103684861, dated Mar. 26, 2014, 32 pages.
Foreign Communication From a Counterpart Application, PCT Application No. PCT/CN2016/085991, English Translation of International Search Report dated Sep. 21, 2016, 2 pages.
Foreign Communication From a Counterpart Application, PCT Application No. PCT/CN2016/085991, English Translation of Written Opinion dated Sep. 21, 2016, 6 pages.
Foreign Communication From a Counterpart Application, European Application No. 16813678.6, Extended European Search Report dated Apr. 25, 2018, 9 pages.

\* cited by examiner

METHOD FOR CONFIGURING FORWARDING TABLE FOR USER EQUIPMENT, APPARATUS, AND SYSTEM

CROSS-REFERENCE TO RELATED APPLICATIONS

This application is a continuation of International Patent Application No. PCT/CN2016/085991 filed on Jun. 16, 2016, which claims priority to Chinese Patent Application No. 201510349681.7 filed on Jun. 23, 2015. The disclosures of the aforementioned applications are hereby incorporated by reference in their entireties.

TECHNICAL FIELD

The present disclosure relates to the field of communications technologies, and in particular, to a method for configuring a forwarding table for user equipment, an apparatus, and a system.

BACKGROUND

In an access network based on a cable, a cable media converter (CMC) and an optical line terminal (OLT) may be regarded as an access node (AN) in the access network. The AN may be logically divided into multiple network slices. One network slice may be regarded as a set of multiple service transmission channels, and each service transmission channel is used for transmitting one type of service data. However, one network slice is used for transmitting only service data belonging to a same retailer, and service data transmitted using different network slices is independent of each other. A network resource wholesaler may allocate different network slices to different retailers such that user equipments of the different retailers share the AN.

To enable service transmission between the different retailers not to affect each other, the AN of the network resource wholesaler needs to identify user equipment using a retailer service in order to transmit, to a server of the retailer using a network slice corresponding to the retailer to which the user equipment belongs, service data sent by the user equipment. For example, one end of the AN accesses N cable modems (CMs), and the other end accesses N service routers. N is an integer greater than or equal to 1. As shown in FIG. 1, a $CM_1$ belongs to a first retailer server, and a $CM_m$ belongs to an $m^{th}$ retailer server, where m is an integer greater than 1. A $CM_1$ of first user equipment accesses the AN, the AN forwards service data of the $CM_1$ to a $router_1$ of the first retailer server, a $CM_m$ of $m^{th}$ user equipment accesses the AN, and the AN forwards service data of the $CM_m$ to a $router_m$ of the $m^{th}$ retailer server. The $router_1$ and the $router_m$ are service routers of different retailer servers, and each router corresponds to one retailer server. On the AN, one forwarding table is configured for each CM that accesses the AN, and the forwarding table is used for indicating a network slice allocated to the CM. The AN may forward service data received by the $CM_1$ to the $router_1$ using a forwarding table configured for the $CM_1$. The AN may forward service data received by a $CM_2$ to a $router_2$ using a forwarding table configured for the $CM_2$. The AN may forward service data received by the $CM_m$ to the $router_m$ using a forwarding table configured for the $CM_m$.

Currently, in an access network based on a cable, multiple user equipments of different retailers share a same AN. When each user equipment accesses a network, a staff member of the network resource wholesaler needs to manually configure one forwarding table on the AN to indicate a forwarding path of service data of the user equipment that accesses the AN such that the AN forwards the service data to a retailer to which the user equipment belongs. However, with development of network technologies, a quantity of user equipments that access ANs enormously increases. Consequently, it takes a long time and high maintenance and operation costs to manually configure a forwarding table for each user equipment that accesses an AN.

SUMMARY

In view of this, the present disclosure provides a method for configuring a forwarding table for user equipment, an apparatus, and a system such that a forwarding table for transmitting service data can be automatically configured for user equipment that accesses a retailer server, helping reduce maintenance and operation costs.

Therefore, in the present disclosure, technical solutions for resolving technical problems are as follows.

According to a first aspect, a method for configuring a forwarding table for user equipment is provided, including receiving, by an operator server, a service access request of user equipment, where the service access request carries a Media Access Control (MAC) address of the user equipment, establishing, by the operator server, a correspondence for the user equipment, where the correspondence includes the MAC address of the user equipment and an identifier of an operator to which the user equipment belongs, and sending, by the operator server, the correspondence to an AN controller.

In a first possible implementation of the first aspect, the correspondence further includes information about an access port allocated to the user equipment, the information about the access port allocated to the user equipment is used for indicating a port of an AN accessed by the user equipment, and the method further includes sending, by the operator server, a network resource request to the AN controller, where the network resource request includes a quantity of user equipments requesting to access the operator server and bandwidth needed by each user equipment, receiving, by the operator server, information that is about at least one access port and that is sent by the AN controller, where the at least one access port is an access port that is allocated on the AN to the operator server, and allocating, by the operator server, information about one access port to the user equipment from the information about the at least one access port.

With reference to the first aspect or the first possible implementation of the first aspect, a second possible implementation of the first aspect is further provided, where the service access request further carries an Internet Protocol (IP) address of user sub-equipment that accesses the user equipment, and establishing, by the operator server, a correspondence for the user equipment further includes adding, by the operator server, the IP address of the user sub-equipment to the correspondence.

According to a second aspect, a method for configuring a forwarding table for user equipment is provided, including receiving, by an AN controller, a correspondence sent by an operator server, where the correspondence includes a MAC address of user equipment and an identifier of an operator to which the user equipment belongs, generating, by the AN controller, a first forwarding table, where the first forwarding table includes a matching field and an action field, the matching field of the first forwarding table includes the MAC address of the user equipment that is used as a source MAC address, the action field of the first forwarding table includes output port information, and the output port information is information about a port on an AN determined according to the identifier of the operator, and sending, by the AN controller, the first forwarding table to the AN.

In a first possible implementation of the second aspect, the correspondence further includes an IP address of user sub-equipment that accesses the user equipment, and generating, by the AN controller, a first forwarding table further includes adding, by the AN controller, the IP address of the user sub-equipment to the matching field of the first forwarding table.

In a second possible implementation of the second aspect, the correspondence further includes information about an access port allocated to the user equipment, the information about the access port allocated to the user equipment is used for indicating a port of an AN accessed by the user equipment, and the method further includes generating, by the AN controller, a second forwarding table, where the second forwarding table includes a matching field and an action field, the matching field of the second forwarding table includes the MAC address of the user equipment that is used as a destination MAC address, and the action field includes the information about the access port allocated to the user equipment, and sending, by the AN controller, the second forwarding table to the AN.

With reference to the second possible implementation of the second aspect, a third possible implementation of the second aspect is further provided, where the correspondence further includes an IP address of user sub-equipment that accesses the user equipment, and generating, by the AN controller, a second forwarding table includes adding, by the AN controller, the IP address of the user sub-equipment to the matching field of the second forwarding table.

With reference to the second aspect, the first possible implementation of the second aspect, the second possible implementation of the second aspect, or the third possible implementation of the second aspect, a fourth possible implementation of the second aspect is further provided, where the method further includes receiving, by the AN controller, a network resource request sent by the operator server, where the network resource request includes a quantity of user equipments requesting to access the operator server and bandwidth needed by each user equipment, allocating, by the AN controller, information about at least one access port to the operator server according to the network resource request, where the at least one access port is an access port on the AN, and sending, by the AN controller, the information about the at least one access port to the operator server.

According to a third aspect, an operator server is provided, including a receiving unit configured to receive a service access request of user equipment, where the service access request carries a MAC address of the user equipment, an establishment unit configured to establish a correspondence for the user equipment, where the correspondence includes the MAC address of the user equipment and an identifier of an operator to which the user equipment belongs, and a sending unit configured to send the correspondence to an AN controller.

In a first possible implementation of the third aspect, the correspondence further includes information about an access port allocated to the user equipment, the information about the access port allocated to the user equipment is used for indicating a port of an AN accessed by the user equipment, and the operator server further includes an allocation unit. The sending unit is further configured to send a network resource request to the AN controller, where the network resource request includes a quantity of user equipments requesting to access the operator server and bandwidth needed by each user equipment. The receiving unit is further configured to receive information that is about at least one access port and that is sent by the AN controller, where the at least one access port is an access port that is allocated on the AN to the operator server, and the allocation unit is configured to allocate information about one access port to the user equipment from the information about the at least one access port.

With reference to the third aspect or the first possible implementation of the third aspect, a second possible implementation of the third aspect is further provided, where the service access request further carries an IP address of user sub-equipment that accesses the user equipment, and the establishment unit is further configured to add the IP address of the user sub-equipment to the correspondence.

According to a fourth aspect, an AN controller is provided, including a receiving unit configured to receive a correspondence sent by an operator server, where the correspondence includes a MAC address of user equipment and an identifier of an operator to which the user equipment belongs, a first generation unit configured to generate a first forwarding table, where the first forwarding table includes a matching field and an action field, the matching field of the first forwarding table includes the MAC address of the user equipment that is used as a source MAC address, the action field of the first forwarding table includes output port information, and the output port information is information about a port on an AN determined according to the identifier of the operator, and a sending unit configured to send the first forwarding table to the AN.

In a first possible implementation of the fourth aspect, the correspondence further includes an IP address of user sub-equipment that accesses the user equipment, and the first generation unit is further configured to add the IP address of the user sub-equipment to the matching field of the first forwarding table.

In a second possible implementation of the fourth aspect, the correspondence further includes information about an access port allocated to the user equipment, the information about the access port allocated to the user equipment is used for indicating a port of an AN accessed by the user equipment, and the AN controller further includes a second generation unit. The second generation unit is configured to generate a second forwarding table, where the second forwarding table includes a matching field and an action field, the matching field of the second forwarding table includes the MAC address of the user equipment that is used as a destination MAC address, and the action field includes the information about the access port allocated to the user equipment, and the sending unit is configured to send the second forwarding table to the AN.

With reference to the second possible implementation of the fourth aspect, a third possible implementation of the fourth aspect is further provided, where the correspondence further includes an IP address of user sub-equipment that accesses the user equipment, and the second generation unit is further configured to add the IP address of the user sub-equipment to the matching field of the second forwarding table.

With reference to the fourth aspect, the first possible implementation of the fourth aspect, the second possible implementation of the fourth aspect, or the third possible implementation of the fourth aspect, a fourth possible implementation of the fourth aspect is further provided, where the AN controller further includes an allocation unit. The receiving unit is further configured to receive a network resource request sent by the operator server, where the network resource request includes a quantity of user equipments requesting to access the operator server and bandwidth needed by each user equipment. The allocation unit is configured to allocate information about at least one access port to the operator server according to the network resource request, where the at least one access port is an access port on the AN, and the sending unit is configured to send the information about the at least one access port to the operator server.

According to a fifth aspect, a system for configuring a forwarding table for user equipment is provided, including the operator server according to any one of the third aspect, the first possible implementation of the third aspect, or the second possible implementation of the third aspect, and the AN controller according to any one of the fourth aspect, the first possible implementation of the fourth aspect, the second possible implementation of the fourth aspect, or the third possible implementation of the fourth aspect.

It can be learned from the foregoing technical solutions that, the present disclosure has the following beneficial effects Embodiments of the present disclosure provide the method for configuring a forwarding table for user equipment, the apparatus, and the system. The operator server receives the service access request of the user equipment, establishes the correspondence for the user equipment, where the correspondence includes the MAC address of the user equipment and the identifier of the operator to which the user equipment belongs, and sends the correspondence to the AN controller. The AN controller generates the first forwarding table according to the correspondence, and sends the first forwarding table to the AN. The AN forwards, using the first forwarding table, the service data of the user equipment to the operator to which the user equipment belongs. In the present disclosure, by means of information exchange between an operator server and an AN controller, the AN controller automatically configures, according to a correspondence generated by the operator server, a first forwarding table for user equipment that accesses the operator server, reducing a time for configuring the first forwarding table for the user equipment, and reducing operation costs.

DESCRIPTION OF EMBODIMENTS

To provide an implementation solution of automatically configuring a forwarding table for user equipment, embodiments of the present disclosure provide a method for configuring a forwarding table for user equipment, an apparatus, and a system. The following describes embodiments of the present disclosure with reference to the accompanying drawings of the specification. It should be understood that, the embodiments described herein are used only for describing and explaining the present disclosure, but are not used for limiting the present disclosure.

Figure 1:
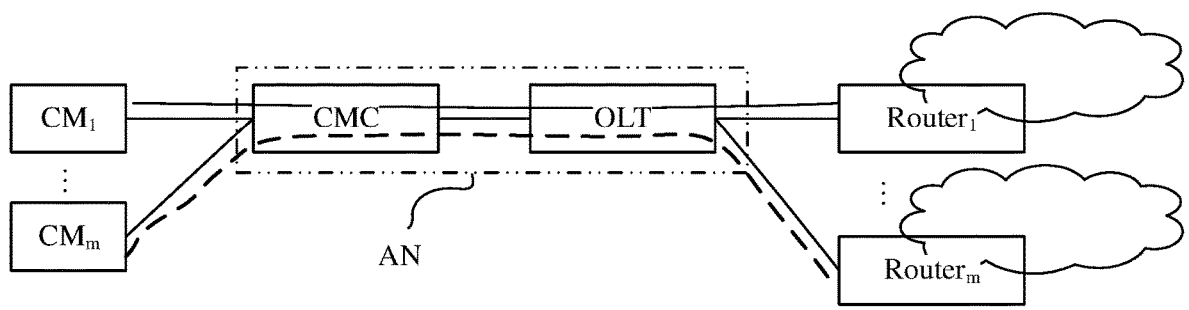
FIG. 1 is a schematic structural diagram of a cable-based access network.
Figure 2:
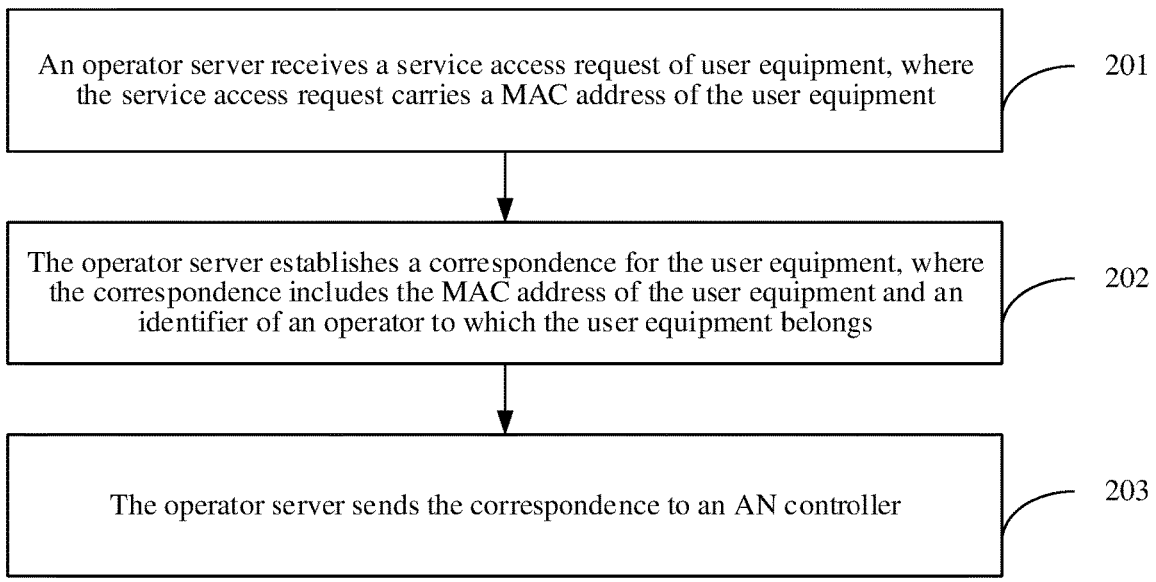
FIG. 2 is a flowchart of a method for configuring a forwarding table for user equipment according to an embodiment of the present disclosure.

FIG. 2 is a flowchart of a method for configuring a forwarding table for user equipment according to an embodiment of the present disclosure. The method includes the following steps.

Step 201: An operator server receives a service access request of user equipment, where the service access request carries a MAC address of the user equipment.

For example, when the user equipment accesses an AN for the first time, and applies for enabling transmission of service data of the user equipment by the AN, the user equipment needs to register with the operator server. The user equipment sends, to the operator server, a service access request for registering with the operator server by a user.

Step 202: The operator server establishes a correspondence for the user equipment, where the correspondence includes the MAC address of the user equipment and an identifier of an operator to which the user equipment belongs.

For example, the operator server establishes, according to the MAC address carried in the service access request sent by the user equipment, the correspondence for the user equipment. The correspondence includes the MAC address of the user equipment and the identifier of the operator to which the user equipment belongs. The MAC address of the user equipment is used for identifying a service data packet from the user equipment. When a source MAC address carried in the service data packet is the MAC address of the user equipment, the service data packet is from the user equipment. The operator identifier is used for indicating an operator that receives the service data packet of the user equipment. It may be understood that, the service data packet sent by the user equipment should be forwarded by the AN to the operator to which the user equipment belongs, and the operator processes the service data packet.

Step 203: The operator server sends the correspondence to an AN controller.

Optionally, the correspondence further includes information about an access port allocated to the user equipment, the information about the access port allocated to the user equipment is used for indicating a port of an AN accessed by the user equipment, and the method further includes sending, by the operator server, a network resource request to the AN controller, where the network resource request includes a quantity of user equipments requesting to access the operator server and bandwidth needed by each user equipment, receiving, by the operator server, information that is about at least one access port and that is sent by the AN controller, where the at least one access port is an access port that is allocated on the AN to the operator server, and allocating, by the operator server, information about one access port to the user equipment from the information about the at least one access port.

For example, the operator server subscribes to a network resource from the AN controller according to network operation and deployment, and sends a network resource request to the AN controller. The quantity of user equipments requesting to access the operator server and the bandwidth needed by each user equipment that are in the network resource request are used for indicating total bandwidth of the network resource requested by the operator server from the AN controller. For example, a quantity of user equipments allowed to access an operation network deployed by the operator server is 1000, bandwidth needed by each user equipment is 10 megabits/second, and then the operator server requests, from the AN controller, a network resource whose bandwidth is 10000 megabits/second.

That the AN controller allocates a network resource to the operator server means that the AN controller sends information about an access port of at least one AN to the operator server according to the network resource request of the operator server, that is, allocates the at least one access port on the AN to the operator server. Bandwidth that can be transmitted by each access port on the AN is known, and an access port that is on at least one AN and that can satisfy the total bandwidth requested by the operator server is allocated to the operator server according to the network resource request of the operator.

The operator server selects one access port from the at least one access port allocated by the AN controller to the operator server, allocates the one access port to the user equipment, and uses the one access port as the access port allocated to the user equipment. It can be known from this that, the information about the access port allocated to the user equipment refers to information about the port on the AN accessed by the user equipment, and the information about the access port may be information about a physical access port on the AN accessed by the user equipment, or may be information about a virtual access port corresponding to a physical access port on the AN accessed by the user equipment.

In an actual application scenario, the operator server generates a local information table during initialization, and the local information table includes a user MAC address, information about an access port, and an operator identifier. When the local information table is just generated, and the user equipment has not registered with the operator server, a value of the user MAC address and a value of the information about the access port are null, and a value of the operator identifier is an identifier allocated by the AN controller to the operator server. Further, the operator identifier may be an identifier of a virtual local area network (VLAN).

When user equipment registers with the operator server, the user equipment sends a service access request to the operator server. The operator server generates a local information entry in the local information table for the user equipment. In the local information entry of the user equipment, a value of a user MAC address is a MAC address carried in the service access request sent by the user equipment. In the local information entry of the user equipment, a value of information about an access port is information about an access port allocated to the user equipment. The operator generates the local information entry for the user equipment, that is, the operator generates a correspondence for the user equipment. The correspondence includes a MAC address of the user equipment, the information about the access port allocated to the user equipment, and an identifier of an operator to which the user equipment belongs.

It should be noted herein that, the operator server generates a local information entry in a local information table for the user equipment, and the correspondence established by the operator server for the user equipment may be in a form of the local information entry. The operator server may further establish the correspondence for the user equipment in another implementation according to an actual case. Details are not described herein.

For example, obtaining, by the operator server, information about at least one access port allocated by the AN controller to the operator is not limited to an implementation in which the AN controller sends the information about the at least one access port to the operator server. There are many other implementations. For example, the information about the at least one access port allocated by the AN controller is notified offline and manually to the operator, and the operator server performs static configuration according to the information that is about the at least one access port and that is offline and manually notified.

The information that is about the at least one access port and that is obtained by the operator server may be information about a physical port. If a physical access port on the AN is faulty, the AN controller needs to re-allocate an available physical access port to the operator server, the AN controller notifies the operator server of the available physical access port, and the operator server replaces information about the faulty physical access port with information about the available physical access port.

Alternatively, the information that is about the at least one access port and that is obtained by the operator server may be information about a virtual port. The AN controller may pre-configure a virtual access port for a physical access port on the AN, and one physical access port corresponds to one virtual access port. The AN controller only needs to send, to the operator server, information about a virtual access port corresponding to the physical access port allocated to the operator server. When a physical access port on the AN controller is faulty, the AN controller only needs to re-allocate an available physical access port to a virtual access port corresponding to the faulty physical access port. The operator server neither needs to know a correspondence between a physical access port and a virtual access port, nor needs to change information about an access port in the operator server, simplifying operation and maintenance, for example, an operation of changing a faulty physical access port, or a physical access port change caused by upgrade of an AN device.

For example, the operator server may send network resource requests to the AN controller for multiple times according to an actual need. The AN controller may allocate information about multiple access ports to the operator server according to the multiple network resource requests of the operator server. For example, a network resource requested by the operator server from the AN controller for the first time has been allocated, and no new user equipment can perform access. If new user equipment needs to perform access, the operator server sends a network resource request to the AN controller for a second time, the AN controller may send information about at least one access port and information about at least one output port again to the operator server according to the second network resource request. Total bandwidth that can be transmitted by the at least one access port can satisfy total bandwidth needed by the second network resource request.

The AN controller may virtualize information about an access port and information about an output port into a virtual AN (vAN), and allocate one vAN identifier (vAN ID) to each vAN, where the access port and the output port are allocated each time to the operator server. That is, one vAN includes the information about the access port and the information about the output port, where the access port and the output port are allocated each time by the AN controller to the operator server. The information about the access port is information about a port that is of the AN and accessed by the user equipment, and the information about the output port is information about a port that is of the AN and accessed by the operator. If an operator server corresponds to at least two vANs, establishing, by the operator server, a correspondence for the user equipment further includes adding, by the operator server, the vAN ID to the correspondence.

Optionally, the service access request further carries an IP address of user sub-equipment that accesses the user equipment, and establishing, by the operator server, a correspondence for the user equipment further includes adding, by the operator server, the IP address of the user sub-equipment to the correspondence.

At least one user sub-equipment may access the user equipment. When the user sub-equipment accesses the user equipment, the operator server allocates an IP address to the user sub-equipment. For example, the user equipment is a CM, and a mobile phone, a tablet computer, a notebook computer, and the like access the CM. Then, the mobile phone, the tablet computer, the notebook computer, and the like are user sub-equipments that access the user equipment CM, and the user sub-equipments such as the mobile phone, the tablet computer, and the notebook computer each have an IP address. In this case, a source IP address and a MAC address that are carried in a service data packet are used for determining user sub-equipment that sends the service data packet.

The operator server sends, to the AN controller, the correspondence established for the user equipment. The AN controller generates a first forwarding table according to the correspondence, and delivers the first forwarding table to the AN. The AN forwards, using the first forwarding table to the operator to which the user equipment belongs, the service data packet sent by the user equipment.

In this embodiment of the present disclosure, the operator server may be a retailer server, or may be a wholesaler server. A retailer may also be referred to as a retail operator, and a wholesaler may also be referred to as a wholesale operator.

Figure 3:
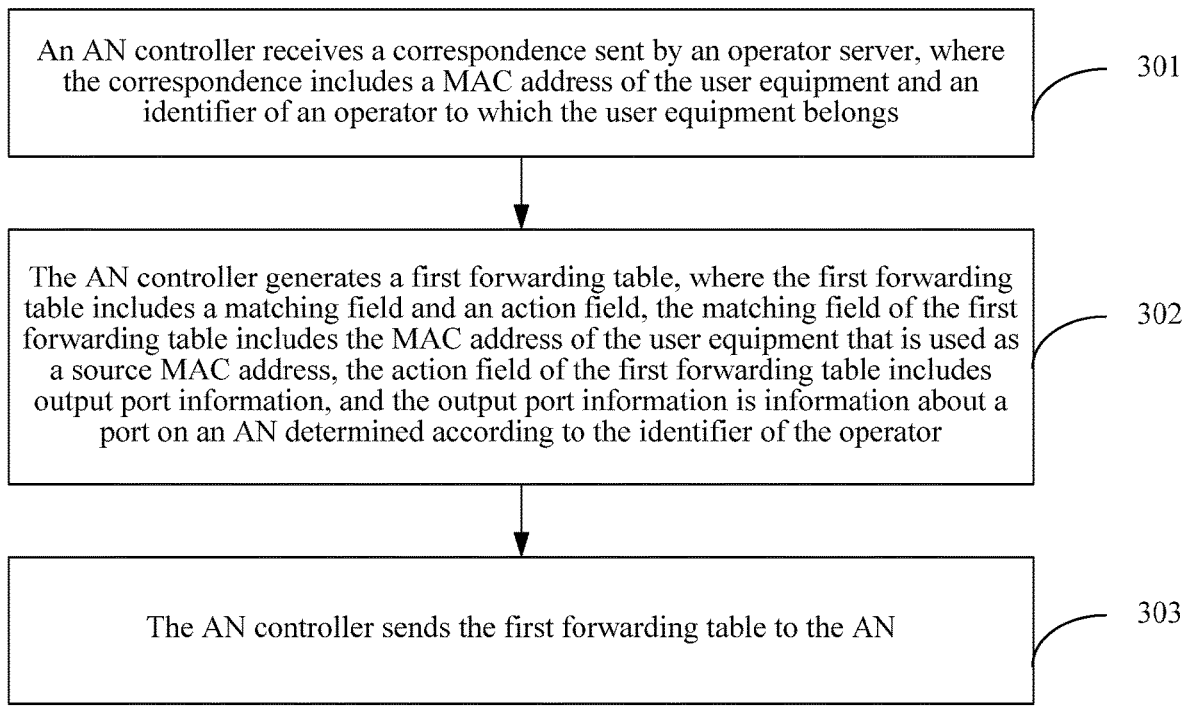
FIG. 3 is a flowchart of a method for configuring a forwarding table for user equipment according to an embodiment of the present disclosure.

FIG. 3 is a flowchart of a method for configuring a forwarding table for user equipment according to an embodiment of the present disclosure. The method includes the following steps.

Step 301: An AN controller receives a correspondence sent by an operator server, where the correspondence includes a MAC address of user equipment and an identifier of an operator to which the user equipment belongs.

Step 302: The AN controller generates a first forwarding table, where the first forwarding table includes a matching field and an action field, the matching field of the first forwarding table includes the MAC address of the user equipment that is used as a source MAC address, the action field of the first forwarding table includes output port information, and the output port information is information about a port on an AN determined according to the identifier of the operator.

Step 303: The AN controller sends the first forwarding table to the AN.

The AN controller receives the correspondence sent by the operator server, and obtains the MAC address of the user equipment and the identifier of the operator to which the user equipment belongs that are carried in the correspondence. The AN controller generates the first forwarding table according to the correspondence, and the AN forwards, using the first forwarding table to the operator to which the user equipment belongs, service data sent by the user equipment. The first forwarding table includes two parts.

A first part included in the first forwarding table: The AN controller generates a matching field of the first forwarding table according to the MAC address of the user equipment, and uses the MAC address of the user equipment, which is used as the source MAC address, as the matching field of the first forwarding table. When a source MAC address carried in a received service data packet is the MAC address of the user equipment, the service data packet matches the matching field of the first forwarding table, indicating that the service data packet is sent by the user equipment.

A second part included in the first forwarding table: The AN controller generates an action field of the first forwarding table according to the identifier of the operator to which the user equipment belongs. On the AN, an operator accesses the AN using one port. That is, one operator corresponds to one port on the AN. The AN controller stores a correspondence between an identifier of the operator and information about the port on the AN accessed by the operator. When generating the action field, the AN controller searches for information about the port on the AN accessed by the operator corresponding to the identifier of the operator, and uses the information as output port information.

The AN controller sends the generated first forwarding table to the AN. The AN forwards a received service data packet using the first forwarding table. When receiving a service data packet, the AN first performs matching between a source MAC address carried in the service data packet and the matching field of the first forwarding table.

When the source MAC address carried in the service data packet does not match the matching field of the first forwarding table, that is, the source MAC address carried in the service data packet is not the MAC address of the user equipment, it indicates that the service data packet is not a service data packet sent by the user equipment.

When the source MAC address carried in the service data packet matches the matching field of the first forwarding table, that is, the source MAC address carried in the service data packet is the MAC address of the user equipment, it indicates that the service data packet is a service data packet sent by the user equipment. The AN forwards the service data packet using the action field of the first forwarding table, and forwards the service data packet to the operator to which the user equipment belongs, and the operator processes the service data packet. When forwarding the service data packet, the AN first adds the identifier of the operator to which the user equipment belongs to the service data packet, then finds an output port that is of the service data packet and that is on the AN according to the output port information in the action field, and outputs the service data packet from the output port to the operator.

Optionally, the correspondence further includes an IP address of user sub-equipment that accesses the user equipment, and generating, by the AN controller, a first forwarding table further includes adding, by the AN controller, the IP address of the user sub-equipment to the matching field of the first forwarding table.

If at least one user sub-equipment accesses user equipment, each user sub-equipment that accesses the user equipment has an IP address allocated by the operator server. The matching field of the first forwarding table further includes the IP address of the user sub-equipment. For multiple service data packets from different user sub-equipments of same user equipment, although source MAC addresses of the multiple service data packets are the same, IP addresses carried in service data packets from the different user sub-equipments are different.

Optionally, the AN controller sends the first forwarding table that includes the IP addresses of the user sub-equipments to the AN. After receiving a service data packet, the AN determines, according to an IP address and a source MAC address that are carried in the service data packet, whether the service data packet matches the matching field of the first forwarding table. If the IP address carried in the service data packet is the same as an IP address in the matching field of the first forwarding table, and the source MAC address carried in the service data packet is the same as a MAC address in the matching field of the first forwarding table, the service data packet matches the matching field of the first forwarding table, and the AN may forward, using the action field of the first forwarding table, the service data packet to the operator to which the user equipment belongs. If the IP address carried in the service data packet is different from the IP address in the matching field of the first forwarding table, or the source MAC address carried in the service data packet is different from the MAC address in the matching field of the first forwarding table, the service data packet does not match the matching field of the first forwarding table.

If the correspondence further includes a vAN ID, the action field of the first forwarding table further includes an action determined according to the operator identifier and the vAN ID. For example, a vAN accessed by the operator is first determined according to the vAN ID, and then information about an output port corresponding to the operator identifier is found from information about at least one output port included in the vAN. The information about the output port is used for indicating an output port of the AN accessed by the operator.

Optionally, the correspondence further includes information about an access port allocated to the user equipment, the information about the access port allocated to the user equipment is used for indicating a port of an AN accessed by the user equipment, and the method further includes generating, by the AN controller, a second forwarding table, where the second forwarding table includes a matching field and an action field, the matching field of the second forwarding table includes the MAC address of the user equipment that is used as a destination MAC address, and the action field includes the information about the access port allocated to the user equipment, and sending, by the AN controller, the second forwarding table to the AN.

The correspondence sent by the operator server to the AN controller further includes the information about the access port allocated to the user equipment, and the AN controller generates the second forwarding table according to the correspondence that includes the information about the access port allocated to the user equipment. The AN forwards, to the user equipment using the second forwarding table, a service data packet returned by the operator to which the user belongs. The second forwarding table includes two parts.

A first part included in the second forwarding table: The AN controller generates a matching field of the second forwarding table according to the MAC address of the user equipment, and uses the MAC address of the user equipment, which is used as the destination MAC address, as the matching field of the second forwarding table. When a destination MAC address carried in a service data packet received by the AN is the MAC address of the user equipment, the service data packet matches the matching field of the second forwarding table, indicating that the service data packet is sent by the operator to which the user equipment belongs to the user equipment.

A second part included in the second forwarding table: The AN controller generates an action field of the second forwarding table according to information about an access port allocated to the user equipment. On the AN, user equipment accesses the AN using an access port. That is, one user equipment corresponds to one access port on the AN. The AN controller generates the action field of the second forwarding table according to the information about the access port allocated to the user equipment.

The AN controller sends the second forwarding table to the AN. When receiving a service data packet sent by the operator, the AN determines, according to a destination MAC address carried in the service data packet, whether the service data packet matches the matching field of the second forwarding table. If the destination MAC address carried in the service data packet is different from the MAC address of the user equipment in the matching field of the second forwarding table, the service data packet does not match the matching field of the second forwarding table. If the destination MAC address carried in the service data is the same as the MAC address of the user equipment in the matching field of the second forwarding table, the service data packet matches the matching field of the second forwarding table.

If the service data packet matches the matching field of the second forwarding table, the AN forwards, according to the information about the access port allocated to the user equipment in the action field of the second forwarding table, the service data packet to the user equipment that belongs to the operator. Because the user equipment accesses the AN using the allocated access port, the AN may forward, using the allocated access port, the service data packet to the user equipment that belongs to the operator.

Optionally, the correspondence includes an IP address of user sub-equipment that accesses the user equipment, and the generating, by the AN controller, a second forwarding table further includes adding, by the AN controller, the IP address of the user sub-equipment to the matching field of the second forwarding table.

At least one user sub-equipment may access the user equipment, and one IP address is allocated by the operator server to each user sub-equipment. The AN controller sends the second forwarding table that includes the IP address of the user sub-equipment to the AN. After receiving a service data packet returned by the operator, the AN determines, according to an IP address and a destination MAC address that are carried in the service data packet, whether the service data packet matches the matching field of the second forwarding table. If the IP address carried in the service data packet is the same as an IP address in the matching field of the second forwarding table, and the destination MAC address carried in the service data packet is the same as the MAC address in the matching field of the second forwarding table, the service data packet matches the matching field of the second forwarding table, and the AN may forward, using the action field of the second forwarding table, the service data packet to the user equipment that belongs to the operator. If the IP address carried in the service data packet is different from the IP address in the matching field of the second forwarding table, or the destination MAC address carried in the service data packet is different from the MAC address in the matching field of the second forwarding table, the service data packet does not match the matching field of the second forwarding table. The information about the access port allocated to the user equipment may be information about a physical access port, or may be information about a virtual access port corresponding to a physical access port.

For example, during initialization, the AN controller may generate a global information table, and the global information table includes information about an access port of the AN, a user MAC address, and an operator identifier. When no user equipment accesses the operator server, a value of the user MAC address and a value of the operator identifier may be null.

If the AN controller receives a correspondence of the user equipment sent by the operator server, the AN controller may generate, for the operator server, a local information entry for the user equipment. The local information entry includes the information about the access port allocated to the user equipment, the MAC address of the user equipment, and the identifier of the operator to which the user equipment belongs. The AN controller updates the global information table using the local information entry sent by the operator server, searches the global information table for an entry in the local information entry corresponding to the information about the access port allocated to the user equipment, updates a value of a user MAC address in the entry to the MAC address of the user equipment, and updates a value of the identifier of the operator in the entry to the identifier of the operator to which the user equipment belongs.

If the information about the access port allocated to the user equipment in the local information entry is information about a physical access port, the AN controller may search the global information table for an entry that is the same as the information about the access port allocated to the user equipment. If the information about the access port allocated to the user equipment in the local information entry is information about a virtual access port, the AN controller may search the information table for an entry of information about a physical access port corresponding to the information about the virtual access port allocated to the user. The information about the access port in the global information table may include only the information about the physical access port, or may include the information about the physical access port, the virtual access port corresponding to the physical access port, and the information about the virtual access port. The global information table generated by the AN controller is mainly used as an information basis for managing and deploying subsequent service data forwarding of the AN.

The AN controller may virtualize information about at least one access port allocated each time to the operator server into a vAN. If the correspondence further includes a vAN ID, the action field of the second forwarding table further includes an action determined according to the access port allocated to the user equipment and the vAN ID. For example, the AN controller first determines, according to the vAN ID, a vAN accessed by the operator, and then finds, from information about at least one access port included in the vAN, the information about the access port allocated to the user equipment.

Optionally, the method further includes receiving, by the AN controller, a network resource request sent by the operator server, where the network resource request includes a quantity of user equipments requesting to access the operator server and bandwidth needed by each user equipment, allocating, by the AN controller, information about at least one access port to the operator server according to the network resource request, where the at least one access port is an access port on the vAN, and sending, by the AN controller, the information about the at least one access port to the operator server.

When receiving the network resource request sent by the operator server, the AN controller determines, according to the quantity of user equipments requesting to access the operator server and the bandwidth needed by each user equipment that are included in the network resource request, total bandwidth needed by the operator server. Then, the AN controller allocates information about at least one access port to the operator according to bandwidth that can be borne on each access port on the AN. Total bandwidth that can be borne on all access ports allocated by the AN controller to the operator is the same as the total bandwidth requested in the network resource request of the operator server.

It can be learned from the foregoing content that, the present disclosure has the following beneficial effects, where by means of information exchange between an operator server and an AN controller, the AN controller automatically configures, according to a correspondence generated by the operator server, a first forwarding table for user equipment that accesses the operator server, reducing a time for configuring the first forwarding table for the user equipment, and reducing operation costs.

Figure 4:
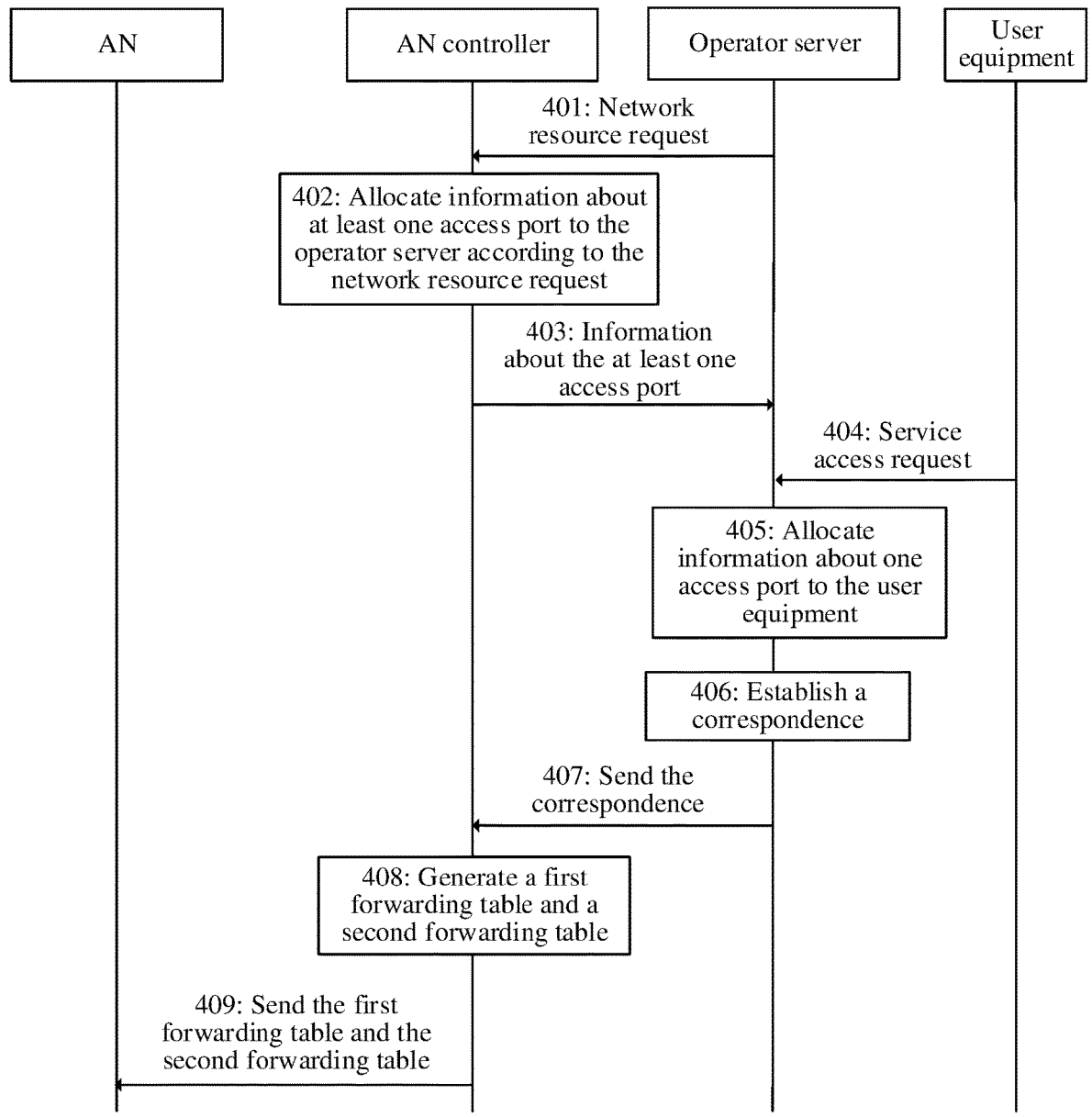
FIG. 4 is a flowchart of a method for configuring a forwarding table for user equipment according to an embodiment of the present disclosure.

FIG. 4 is a sequence diagram of a scenario embodiment of a method for configuring a forwarding table for user equipment according to an embodiment of the present disclosure. The method includes the following steps.

Step 401: An operator server sends a network resource request to an AN controller, where the network resource request includes a quantity of user equipments requesting to access the operator server and bandwidth needed by each user equipment.

Step 402: The AN controller receives the network resource request sent by the operator server, and allocates information about at least one access port to the operator server according to the network resource request, where the at least one access port is an access port on a vAN.

Step 403: The AN controller sends the information about the at least one access port to the operator server.

Step 404: The operator server receives a service access request of user equipment, where the service access request carries a MAC address of the user equipment.

Step 405: The operator server allocates information about one access port to the user equipment from the information about the at least one access port.

Step 406: The operator server establishes a correspondence for the user equipment, where the correspondence includes the information about the access port allocated to the user equipment, the MAC address of the user equipment, and an identifier of an operator to which the user equipment belongs.

Step 407: The operator server sends the correspondence to the AN controller.

Step 408: The AN controller receives the correspondence sent by the operator server, and generates a first forwarding table, where the first forwarding table includes a matching field and an action field, the matching field of the first forwarding table includes the MAC address of the user equipment that is used as a source MAC address, the action field of the first forwarding table includes output port information, and the output port information is information about a port on an AN determined according to the identifier of the operator, and the AN controller generates a second forwarding table, where the second forwarding table includes a matching field and an action field, the matching field of the second forwarding table includes the MAC address of the user equipment that is used as a destination MAC address, and the action field includes the information about the access port allocated to the user equipment.

Step 409: The AN controller sends the first forwarding table and the second forwarding table to the AN.

A specific implementation in the scenario embodiment of the method for configuring a forwarding table for user equipment shown in FIG. 4 is similar to implementations of the methods for configuring a forwarding table for user equipment shown in FIG. 2 and FIG. 3. Refer to the specific descriptions of the methods for configuring a forwarding table for user equipment shown in FIG. 2 and FIG. 3. Details are not described herein again.

Figure 5:
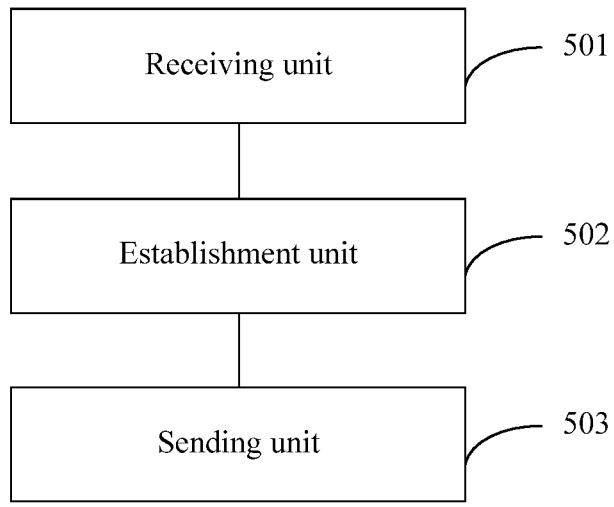
FIG. 5 is a schematic structural diagram of an operator server according to an embodiment of the present disclosure.

FIG. 5 is a schematic structural diagram of an operator server according to an embodiment of the present disclosure. The operator server provided in this embodiment of the present disclosure can perform the method for configuring a forwarding table for user equipment provided in FIG. 2 of the embodiments of the present disclosure. The operator server provided in this embodiment of the present disclosure may be the operator server in the embodiment shown in FIG. 2. The operator server provided in this embodiment of the present disclosure includes a receiving unit 501 configured to receive a service access request of user equipment, where the service access request carries a MAC address of the user equipment, an establishment unit 502 configured to establish a correspondence for the user equipment, where the correspondence includes the MAC address of the user equipment and an identifier of an operator to which the user equipment belongs, and a sending unit 503 configured to send the correspondence to an AN controller.

Optionally, the correspondence further includes information about an access port allocated to the user equipment, the information about the access port allocated to the user equipment is used for indicating a port of an AN accessed by the user equipment, and the operator server further includes an allocation unit (not shown). The sending unit 503 is further configured to send a network resource request to the AN controller, where the network resource request includes a quantity of user equipments requesting to access the operator server and bandwidth needed by each user equipment. The receiving unit 501 is further configured to receive information that is about at least one access port and that is sent by the AN controller, where the at least one access port is an access port that is allocated on the AN to the operator server, and the allocation unit is configured to allocate information about one access port to the user equipment from the information about the at least one access port.

Optionally, the service access request further carries an IP address of user sub-equipment that accesses the user equipment, and the establishment unit 502 is further configured to add the IP address of the user sub-equipment to the correspondence.

Figure 6:
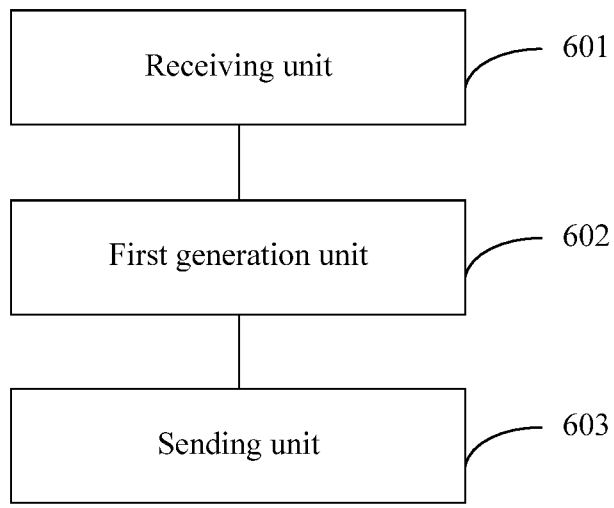
FIG. 6 is a schematic structural diagram of an AN controller according to an embodiment of the present disclosure.

FIG. 6 is a schematic structural diagram of an AN controller according to an embodiment of the present disclosure. The AN controller provided in this embodiment of the present disclosure can perform the method for configuring a forwarding table for user equipment provided in FIG. 3 of the embodiments of the present disclosure. The AN controller provided in this embodiment of the present disclosure may be the AN controller in the embodiment shown in FIG. 3. The AN controller provided in this embodiment of the present disclosure includes a receiving unit 601 configured to receive a correspondence sent by an operator server, where the correspondence includes a MAC address of user equipment and an identifier of an operator to which the user equipment belongs, a first generation unit 602 configured to generate a first forwarding table, where the first forwarding table includes a matching field and an action field, the matching field of the first forwarding table includes the MAC address of the user equipment that is used as a source MAC address, the action field of the first forwarding table includes output port information, and the output port information is information about a port on an AN determined according to the identifier of the operator, and a sending unit 603 configured to send the first forwarding table to the AN.

Optionally, the correspondence further includes an IP address of user sub-equipment that accesses the user equipment, and the first generation unit 602 is further configured to add the IP address of the user sub-equipment to the matching field of the first forwarding table.

Optionally, the correspondence further includes information about an access port allocated to the user equipment, the information about the access port allocated to the user equipment is used for indicating a port of an AN accessed by the user equipment, and the AN controller further includes a second generation unit (not shown). The second generation unit is configured to generate a second forwarding table, where the second forwarding table includes a matching field and an action field, the matching field of the second forwarding table includes the MAC address of the user equipment that is used as a destination MAC address, and the action field includes the information about the access port allocated to the user equipment, and the sending unit 603 is further configured to send the second forwarding table to the AN.

Optionally, the correspondence further includes an IP address of user sub-equipment that accesses the user equipment, and the second generation unit is further configured to add the IP address of the user sub-equipment to the matching field of the second forwarding table.

Optionally, the AN controller further includes an allocation unit (not shown). The receiving unit 601 is further configured to receive a network resource request sent by the operator server, where the network resource request includes a quantity of user equipments requesting to access the operator server and bandwidth needed by each user equipment, the allocation unit is configured to allocate information about at least one access port to the operator server according to the network resource request, where the at least one access port is an access port on the AN, and the sending unit 603 is further configured to send the information about the at least one access port to the operator server.

Figure 7:
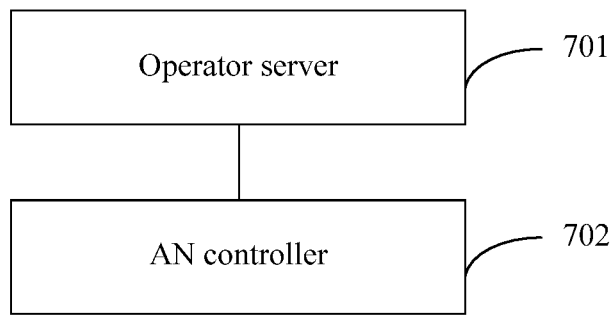
FIG. 7 is a schematic structural diagram of a system for configuring a forwarding table for user equipment according to an embodiment of the present disclosure.

FIG. 7 is a schematic structural diagram of a system for configuring a forwarding table for user equipment according to an embodiment of the present disclosure. The system includes an operator server 701 similar to the operator server shown in FIG. 5 and an AN controller 702 similar to the AN controller shown in FIG. 6.

Figure 8:
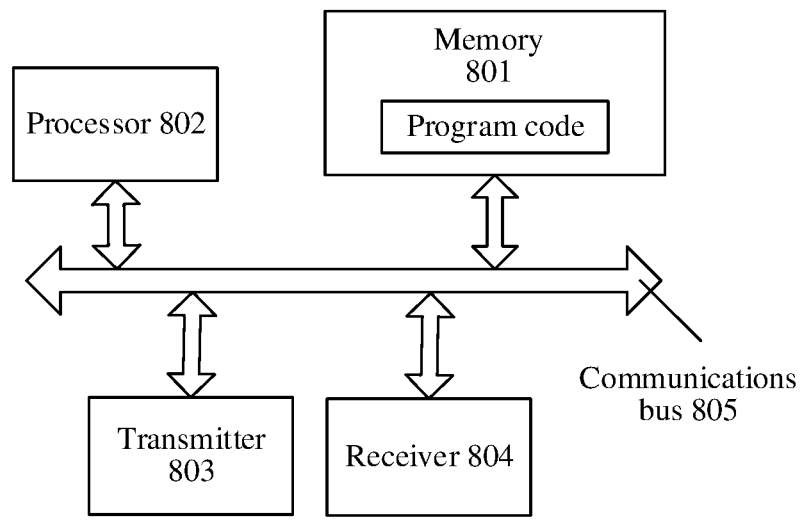
FIG. 8 is a schematic structural diagram of an operator server according to an embodiment of the present disclosure.

FIG. 8 is a schematic structural diagram of an operator server for configuring a forwarding table for user equipment according to an embodiment of the present disclosure. The operator server provided in this embodiment of the present disclosure can perform the method shown in FIG. 2 in the present disclosure. The operator server provided in this embodiment of the present disclosure may be the operator server in the embodiment shown in FIG. 2. The operator server shown in FIG. 8 and the operator server shown in FIG. 5 may be a same operator server. FIG. 8 shows, from the physical perspective, content included in the operator server, and FIG. 5 shows, from the logical perspective, content included in the operator server.

The operator server provided in this embodiment of the present disclosure includes a memory 801, a processor 802, a transmitter 803, a receiver 804, and a communications bus 805. The processor 802, the memory 801, the transmitter 803, and the receiver 804 communicate with each other using the communications bus 805.

The receiver 804 is configured to receive a service access request of user equipment, where the service access request carries a MAC address of the user equipment.

The memory 801 is configured to store program code. The processor 802 is configured to perform establishing a correspondence for the user equipment after reading the program code stored in the memory 801, where the correspondence includes the MAC address of the user equipment and an identifier of an operator to which the user equipment belongs.

The transmitter 803 is configured to send the correspondence to an AN controller.

Optionally, the correspondence further includes information about an access port allocated to the user equipment, the information about the access port allocated to the user equipment is used for indicating a port of an AN accessed by the user equipment, the transmitter 803 is further configured to send, a network resource request to the AN controller, where the network resource request includes a quantity of user equipments requesting to access the operator server and bandwidth needed by each user equipment, the receiver 804 is further configured to receive information that is about at least one access port and that is sent by the AN controller, where the at least one access port is an access port that is allocated on the AN to the operator server, and the processor 802 is further configured to allocate information about one access port to the user equipment from the information about the at least one access port.

Optionally, the service access request further carries an IP address of user sub-equipment that accesses the user equipment, and the processor 802 is further configured to add the IP address of the user sub-equipment to the correspondence.

Figure 9:
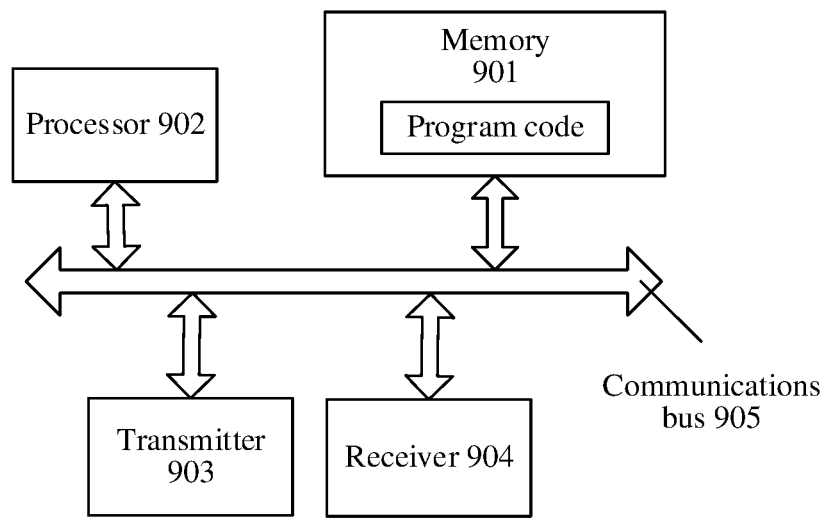
FIG. 9 is a schematic structural diagram of an AN controller according to an embodiment of the present disclosure.

FIG. 9 is a schematic structural diagram of an AN controller according to an embodiment of the present disclosure. The AN controller provided in this embodiment of the present disclosure can perform the method shown in FIG. 3 in the present disclosure. The AN controller provided in this embodiment of the present disclosure may be the AN controller in the embodiment shown in FIG. 3. The AN controller shown in FIG. 9 and the AN controller shown in FIG. 6 may be a same AN controller. FIG. 9 shows, from the physical perspective, content included in the AN controller, and FIG. 6 shows, from the logical perspective, content included in the AN controller.

The AN controller provided in this embodiment of the present disclosure includes a memory 901, a processor 902, a transmitter 903, a receiver 904, and a communications bus 905. The processor 902, the memory 901, the transmitter 903, and the receiver 904 communicate with each other using the communications bus 905.

The receiver 904 is configured to receive a correspondence sent by an operator server, where the correspondence includes a MAC address of user equipment and an identifier of an operator to which the user equipment belongs.

The memory 901 is configured to store program code. The processor 902 is configured to perform generating a first forwarding table after reading the program code stored in the memory 901, where the first forwarding table includes a matching field and an action field, the matching field of the first forwarding table includes the MAC address of the user equipment that is used as a source MAC address, the action field of the first forwarding table includes output port information, and the output port information is information about a port on an AN determined according to the identifier of the operator.

The transmitter 903 is configured to send the first forwarding table to the AN.

Optionally, the correspondence further includes an IP address of user sub-equipment that accesses the user equipment, and the processor 902 is further configured to add the IP address of the user sub-equipment to the matching field of the first forwarding table.

Optionally, the correspondence further includes information about an access port allocated to the user equipment, the information about the access port allocated to the user equipment is used for indicating a port of an AN accessed by the user equipment, the processor 902 is further configured to generate a second forwarding table, where the second forwarding table includes a matching field and an action field, the matching field of the second forwarding table includes the MAC address of the user equipment that is used as a destination MAC address, and the action field includes the information about the access port allocated to the user equipment, and the transmitter 903 is further configured to send the second forwarding table to the AN.

Optionally, the correspondence further includes an IP address of user sub-equipment that accesses the user equipment, and the processor 902 is further configured to add the IP address of the user sub-equipment to the matching field of the second forwarding table.

Optionally, the receiver 904 is further configured to receive a network resource request sent by the operator server, where the network resource request includes a quantity of user equipments requesting to access the operator server and bandwidth needed by each user equipment, the processor 902 is further configured to allocate information about at least one access port to the operator server according to the network resource request, where the at least one access port is an access port on the AN, and the transmitter 903 is further configured to send the information about the at least one access port to the operator server.

Figure 10:
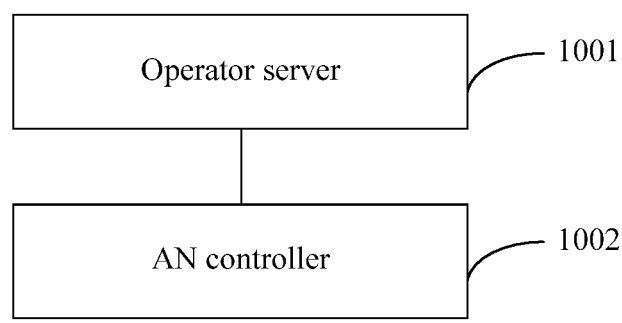
FIG. 10 is a schematic structural diagram of hardware of a system for configuring a forwarding table for user equipment according to an embodiment of the present disclosure.

FIG. 10 is a schematic structural diagram of hardware of a system for configuring a forwarding table for user equipment according to an embodiment of the present disclosure. The system includes an operator server 1001 similar to the operator server shown in FIG. 8 and an AN controller 1002 similar to the AN controller shown in FIG. 9.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method implemented by an access node (AN) controller, wherein the method comprises:
   receiving a correspondence from an operator server, wherein the correspondence comprises a first identifier of user equipment, information about an access port allocated to the user equipment, and an operator identifier for an operator to which the user equipment belongs, wherein the first identifier is used for identifying a service data packet from the user equipment, and wherein the information about the access port allocated to the user equipment indicates a second port of the AN associated with the user equipment;
   generating, based on the correspondence, a first forwarding table comprising a matching field and an action field, wherein the matching field comprises the first identifier, wherein the action field comprises output port information, and wherein the output port information comprises second information about a first port on an AN determined according to the operator identifier;
   generating, a second forwarding table, wherein the second forwarding table comprises a second matching field and a second action field, wherein the second matching field comprises a second identifier that identifies a destination user equipment, and wherein the second action field comprises the information about the access port allocated to the user equipment; and
   sending the first forwarding table and the second forwarding table to the AN.

2. The method of claim 1, wherein the correspondence further comprises an Internet Protocol (IP) address of a user sub-equipment associated with the user equipment, and wherein generating the first forwarding table comprises adding the IP address to the matching field.

3. The method of claim 1, wherein the correspondence further comprises an Internet Protocol (IP) address of a user sub-equipment that is associated with the user equipment, and wherein generating the second forwarding table comprises adding, by the AN controller, the IP address to the matching field of the second forwarding table.

4. The method of claim 1, further comprising:
   receiving a network resource request from the operator server, wherein the network resource request comprises a quantity of user equipment requesting to access the operator server and bandwidth needed by each quantity of the user equipment;
   allocating third information about at least one access port to the operator server according to the network resource request, wherein at least one of the access ports comprises an AN access port; and
   sending the third information to the operator server.

5. The method of claim 1, wherein the access port allocated to the user equipment is a virtual access port corresponding to a physical AN access port.

6. The method of claim 1, wherein the access port allocated to the user equipment is a physical AN access port.

7. An operator server, comprising:
   a memory configured to store a program code;
   a receiver configured to:
      receive a service access request of a user equipment, wherein the service access request comprises a first identifier that identifies a service data packet from the user equipment, and wherein the service access request further carries an Internet Protocol (IP) address of a user sub-equipment associated with the user equipment; and
      receive information about at least one access port from an AN controller, wherein at least one of the access ports comprises an AN access port allocated to the operator server;
   a processor coupled to the memory and the receiver and configured to:
      establish a correspondence for the user equipment after reading the program code stored in the memory, wherein the correspondence comprises the first identifier, information about an access port allocated to the user equipment, and an operator identifier for an operator to which the user equipment belongs, and wherein the information about the access port indicates a second port of the AN associated with the user equipment;
      add the IP address of the user sub-equipment to the correspondence; and allocate information about one access port to the user equipment from the information about at least one of the access ports; and a transmitter coupled to the processor and configured to:
send the correspondence to an access node (AN) controller; and
send a network resource request to the AN controller, wherein the network resource request comprises a quantity of user equipment requesting access to the operator server and bandwidth needed by the user equipment.

8. The operator server of claim 7, wherein a media access control (MAC) address of the user equipment, the operator identifier, and the access port allocated to the user equipment are stored in a local information entry.

9. The operator server of claim 7, wherein the access port allocated to the user equipment is a virtual access port corresponding to a physical AN access port.

10. The operator server of claim 7, wherein the access port allocated to the user equipment is a physical AN access port.

11. The operator server of claim 7, wherein the processor is further configured to allocate the access port to the user equipment.

12. The operator server of claim 7, wherein the correspondence further comprises an Internet Protocol (IP) address of a user sub-equipment associated with the user equipment.

13. An access node (AN) controller, comprising:
a memory configured to store a program code;
a receiver configured to receive a correspondence from an operator server, wherein the correspondence comprises a first identifier of a user equipment, information about an access port allocated to the user equipment, and an operator identifier for an operator to which the user equipment belongs, wherein the information indicates a second port of the AN associated with the user equipment, and wherein the first identifier is used for identifying a service data packet from the user equipment;
a processor coupled to the memory and the receiver and configured to:
generate a first forwarding table based on the correspondence after reading the program code stored in the memory, wherein the first forwarding table comprises a matching field and an action field, wherein the matching field comprises the first identifier, wherein the action field comprises output port information, and wherein the output port information comprises second information about a first port on an AN determined according to the operator identifier; and
generate a second forwarding table, wherein the second forwarding table comprises a second matching field and a second action field, wherein the second matching field comprises a second identifier that identifies a destination user equipment, and wherein the second action field comprises the information about the access port allocated to the user equipment; and
a transmitter coupled to the processor and configured to send the first forwarding table and the second forwarding table to the AN.

14. The AN controller of claim 13, wherein the correspondence further comprises an Internet Protocol (IP) address of a user sub-equipment associated with the user equipment, and wherein the processor is further configured to add the IP address to the matching field.

15. The AN controller of claim 13, wherein the correspondence further comprises an Internet Protocol (IP) address of a user sub-equipment associated with the user equipment, and wherein the processor is further configured to add the IP address to the second matching field.

16. The AN controller of claim 13, wherein the receiver is further configured to receive a network resource request from the operator server, wherein the network resource request comprises a quantity of user equipment requesting access to the operator server and bandwidth needed by each quantity of the user equipment, wherein the processor is further configured to allocate information about at least one access port to the operator server according to the network resource request, wherein at least one of the access ports comprises an AN access port, and wherein the transmitter is further configured to send the information about at least one of the access ports to the operator server.

17. The AN controller of claim 13, wherein the access port allocated to the user equipment is a virtual access port corresponding to a physical AN access port.

18. The AN controller of claim 13, wherein the access port allocated to the user equipment is a physical AN access port.

* * * * *